US012625422B2

(12) United States Patent
Tsuge

(10) Patent No.: US 12,625,422 B2
(45) Date of Patent: May 12, 2026

(54) SCREEN UNIT, METHOD FOR ASSEMBLING SCREEN UNIT, AND METHOD FOR DISASSEMBLING SCREEN UNIT

(71) Applicant: YAMAHA CORPORATION, Hamamatsu (JP)

(72) Inventor: Yoshiyuki Tsuge, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 138 days.

(21) Appl. No.: 18/425,473

(22) Filed: Jan. 29, 2024

(65) Prior Publication Data

US 2024/0255840 A1    Aug. 1, 2024

(30) Foreign Application Priority Data

Jan. 31, 2023    (JP) ................................. 2023-012712
Jan. 26, 2024    (JP) ................................. 2024-009863

(51) Int. Cl.
*G03B 21/60*        (2014.01)
*G03B 21/58*        (2014.01)
G03B 21/56        (2006.01)

(52) U.S. Cl.
CPC ............. *G03B 21/60* (2013.01); *G03B 21/58* (2013.01); *G03B 21/56* (2013.01)

(58) Field of Classification Search
CPC ......... G03B 21/56; G03B 21/58; G03B 21/60
USPC ....................................................... 359/449
See application file for complete search history.

(56) References Cited

U.S. PATENT DOCUMENTS

| | | | | |
|---|---|---|---|---|
| 5,724,775 A | * | 3/1998 | Zobel, Jr. ............... | G03B 21/56 |
| | | | | 52/80.1 |
| 11,487,195 B2 | * | 11/2022 | Tamura .................. | G03B 21/58 |
| 2016/0266481 A1 | * | 9/2016 | Abe ........................ | G03B 21/58 |
| 2020/0043386 A1 | * | 2/2020 | Kim ........................ | G09F 9/301 |
| 2022/0017786 A1 | * | 1/2022 | Wang ...................... | C09J 7/255 |

FOREIGN PATENT DOCUMENTS

| | | | | |
|---|---|---|---|---|
| JP | 2008040153 A | 2/2008 | | |
| JP | 2022128611 A | 9/2022 | | |
| KR | 100812205 B1 | * | 3/2008 | .......... H04N 9/3173 |

OTHER PUBLICATIONS

Extended European Search Report issued in European Appln. No. 24154987.2, mailed Jul. 16, 2024.

* cited by examiner

*Primary Examiner* — Christopher E Mahoney
(74) *Attorney, Agent, or Firm* — ROSSI, KIMMS & McDOWELL LLP

(57) ABSTRACT
A screen unit includes: a frame; a plurality of panels configured to display an image projected by a projector and configured to be detachably attachable to the frame; and an intermediate member configured to display the image projected by the projector and being provided across the plurality of panels in a state where the plurality of panels are detachably attached to the frame. Each of the plurality of panels includes a first screen sheet, a first blocking film configured to block light, and a base material. The intermediate member includes a second screen sheet and a second blocking film. The first screen sheet and the second screen sheet have the same optical characteristics as each other, and the first blocking film and the second blocking film have the same optical characteristics as each other.

20 Claims, 10 Drawing Sheets

FIG. 6
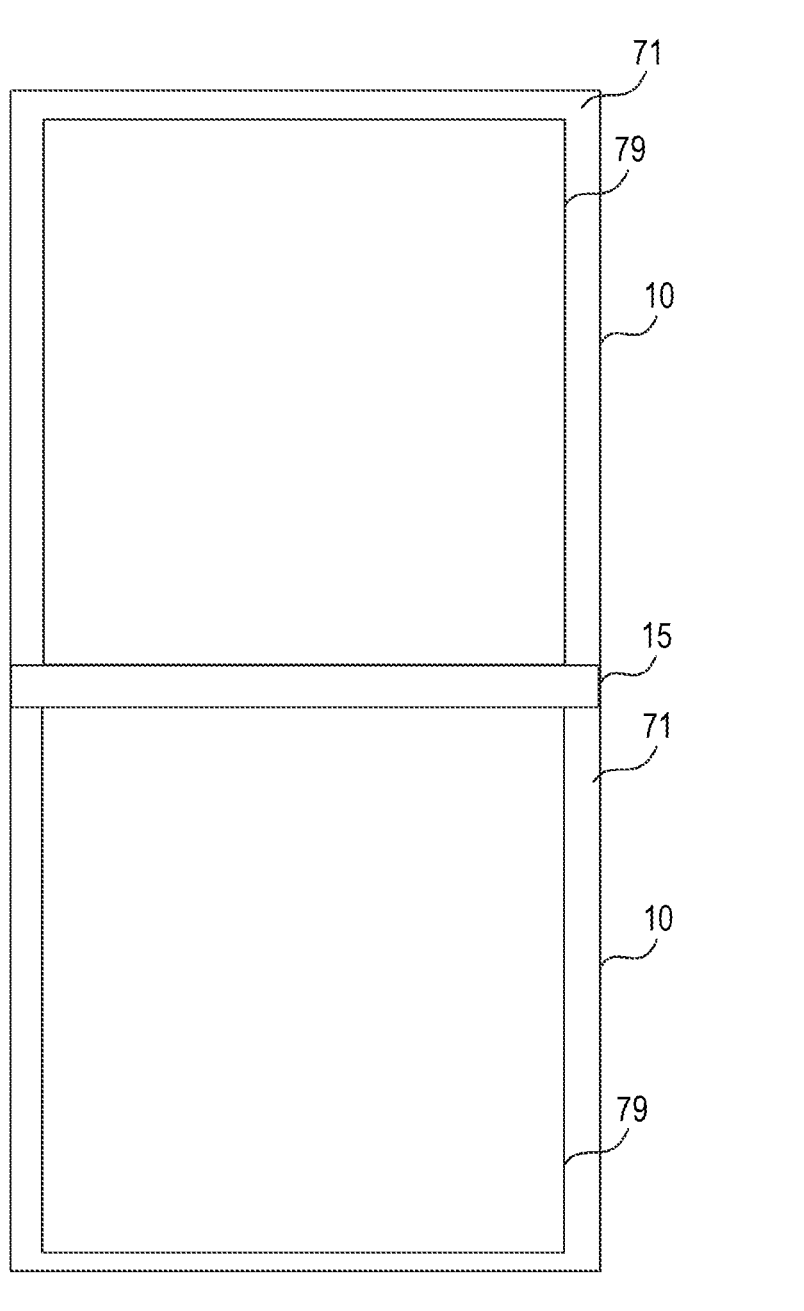
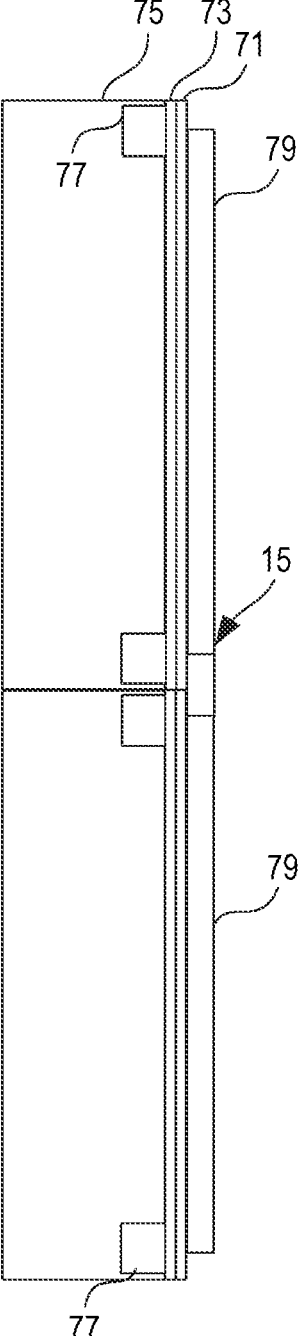

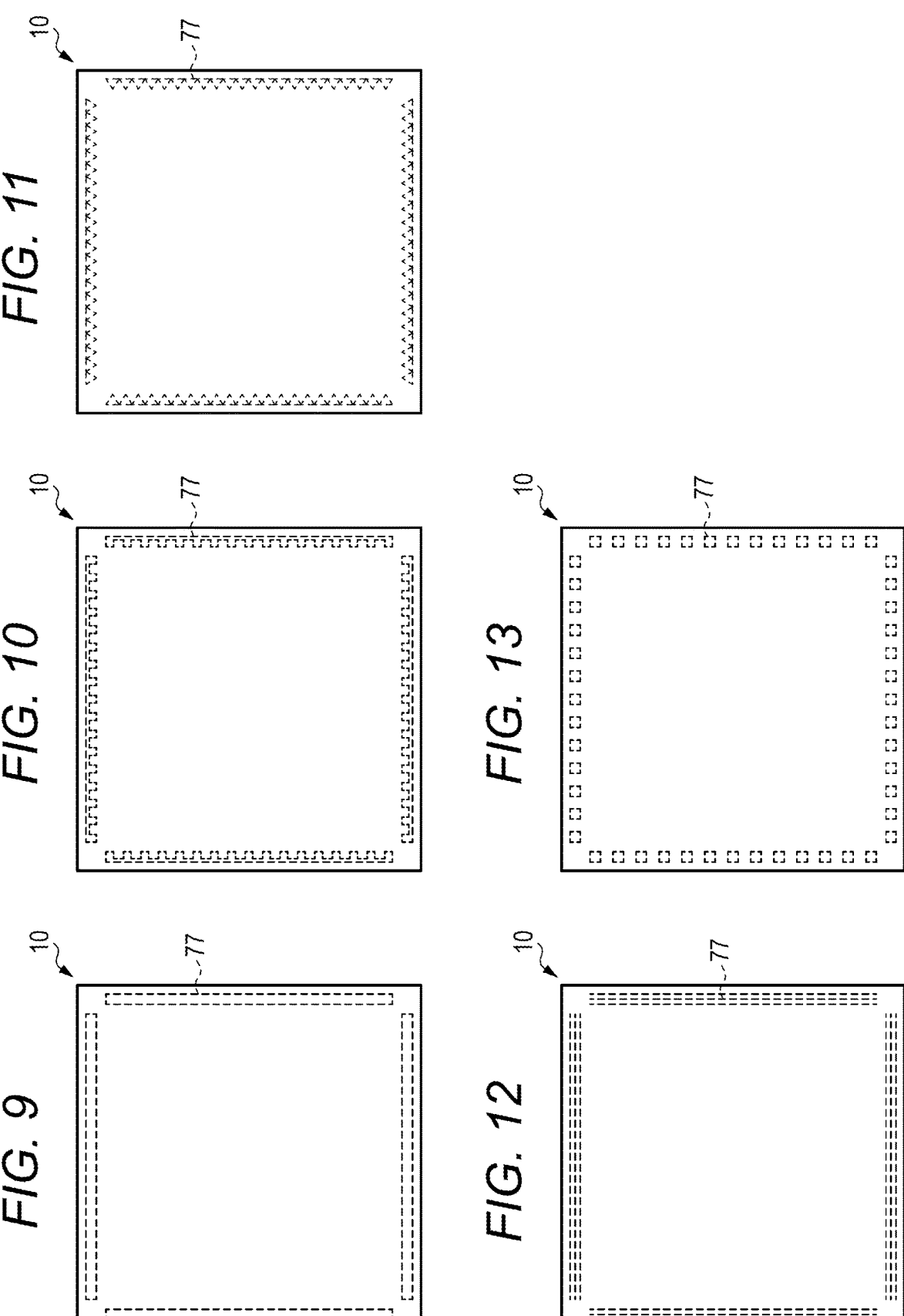

SCREEN UNIT, METHOD FOR ASSEMBLING SCREEN UNIT, AND METHOD FOR DISASSEMBLING SCREEN UNIT

CROSS-REFERENCE TO RELATED APPLICATIONS

This application is based on and claims priority under 35 USC 119 from Japanese Patent Application No. 2023-012712 filed on Jan. 31, 2023 and Japanese Patent Application No. 2024-009863 filed on Jan. 26, 2024, the contents of which are incorporated herein by reference.

FIELD

The present disclosure relates to a screen unit, a method for assembling a screen unit, and a method for disassembling a screen unit.

BACKGROUND

JP2022-128611A discloses a video device including a projector, a screen, and a holder for mounting the screen. The screen in JP2022-128611A includes a magnet sheet attached to a back surface of the screen. The holder is formed by providing and joining a plurality of partition plates via a joint. The partition plate includes a portion for adhering to the magnet sheet. The video device includes a screen flattening unit that flattens the unevenness of the magnet sheet caused by a step and/or a gap at the joint of the partition plate.

JP2008-040153A discloses a roll-type screen subjected to aluminum vapor deposition.

SUMMARY

A screen in the related art is a rolled sheet, and is a sheet that is thick and heavy to prevent wrinkles from forming on a surface thereof. Therefore, the portability of the screen in the related art is low.

A configuration in JP2022-128611A is also difficult to handle since one large screen sheet is stretched over the holder. In the configuration in JP2022-128611A, the projected area cannot be changed.

The present disclosure has been made in view of the above circumstances, and an object thereof is to provide a screen unit that can be installed fairly easily, that has high portability, that can easily change the projected area, and that has high quality, and also provide a method for assembling the screen unit and a method for disassembling the screen unit.

The present disclosure provides a screen unit including: a frame; a plurality of panels configured to display an image projected by a projector and configured to be detachably attachable to the frame; and an intermediate member configured to display the image projected by the projector and being provided across the plurality of panels in a state where the plurality of panels are detachably attached to the frame, in which: each of the plurality of panels includes a first screen sheet, a first blocking film configured to block light, and a base material; the intermediate member includes a second screen sheet and a second blocking film; and the first screen sheet and the second screen sheet have the same optical characteristics as each other, and the first blocking film and the second blocking film have the same optical characteristics as each other.

The present disclosure provides a method for assembling a screen unit, the method including: placing a frame on a placement surface; attaching a plurality of panels to the frame placed on the placement surface, the plurality of panels being configured to display an image projected by a projector; and providing an intermediate member across the plurality of panels attached to the frame, the intermediate member being configured to display the image projected by the projector, in which: each of the plurality of panels includes a first screen sheet, a first blocking film configured to block light, and a base material; the intermediate member includes a second screen sheet and a second blocking film; and the first screen sheet and the second screen sheet have the same optical characteristics as each other, and the first blocking film and the second blocking film have the same optical characteristics as each other.

The present disclosure provides a method for disassembling a screen unit, the method including: detaching an intermediate member from a screen unit, the screen unit including a frame and a plurality of panels configured to display an image projected by a projector and to be detachably attachable to the frame, the intermediate member being configured to display the image projected by the projector and being provided across the plurality of panels detachably attached to the frame; and detaching the plurality of panels from the frame, in which: each of the plurality of panels includes a first screen sheet, a first blocking film configured to block light, and a base material; the intermediate member includes a second screen sheet and a second blocking film; and the first screen sheet and the second screen sheet have the same optical characteristics as each other, and the first blocking film and the second blocking film have the same optical characteristics as each other.

According to the present disclosure, it is possible to provide a screen unit that can be installed fairly easily, that has high portability, that can easily change the projected area, and that has high quality, and also provide a method for assembling the screen unit and a method for disassembling the screen unit.

BRIEF DESCRIPTION OF DRAWINGS

The present disclosure will be described in detail based on the following without being limited thereto, wherein:

FIG. 6 is a front view and a side view when two panels according to a modification 2 are vertically arranged;

FIG. 9 is a front view of a panel according to a modification 5;

FIG. 10 is a front view of a panel according to a modification 6;

FIG. 11 is a front view of a panel according to a modification 7;

FIG. 12 is a front view of a panel according to a modification 8;

FIG. 13 is a front view of a panel according to a modification 9;

DETAILED DESCRIPTION

Figure 1:
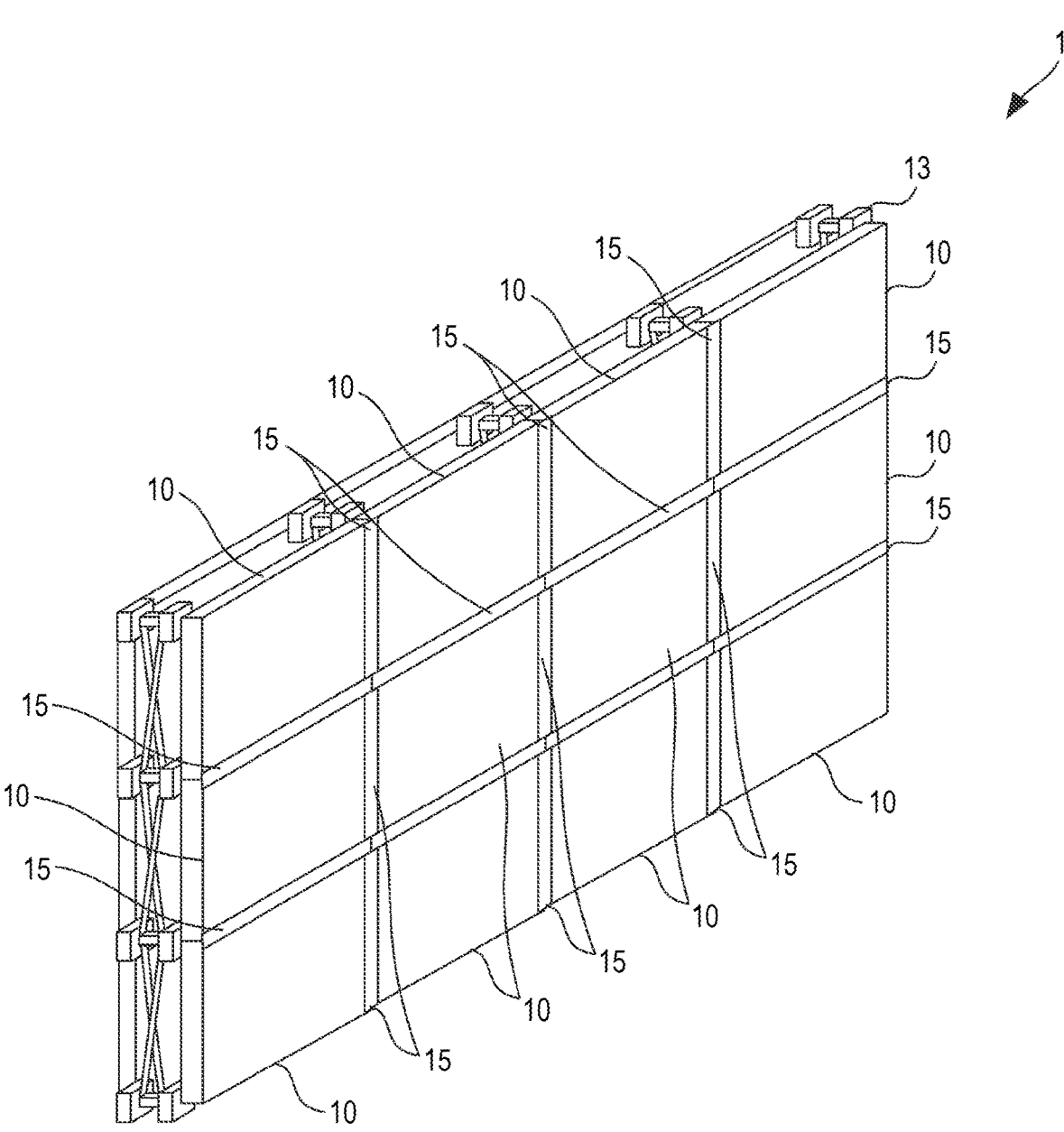
FIG. 1 is a perspective view of a screen unit.

FIG. 1 is a perspective view of the screen unit 1. The screen unit 1 includes the plate-shaped panel 10, the frame 13, and an intermediate member 15. In an example in FIG. 1, the screen unit 1 includes twelve panels 10 and five intermediate members 15.

Figure 2:
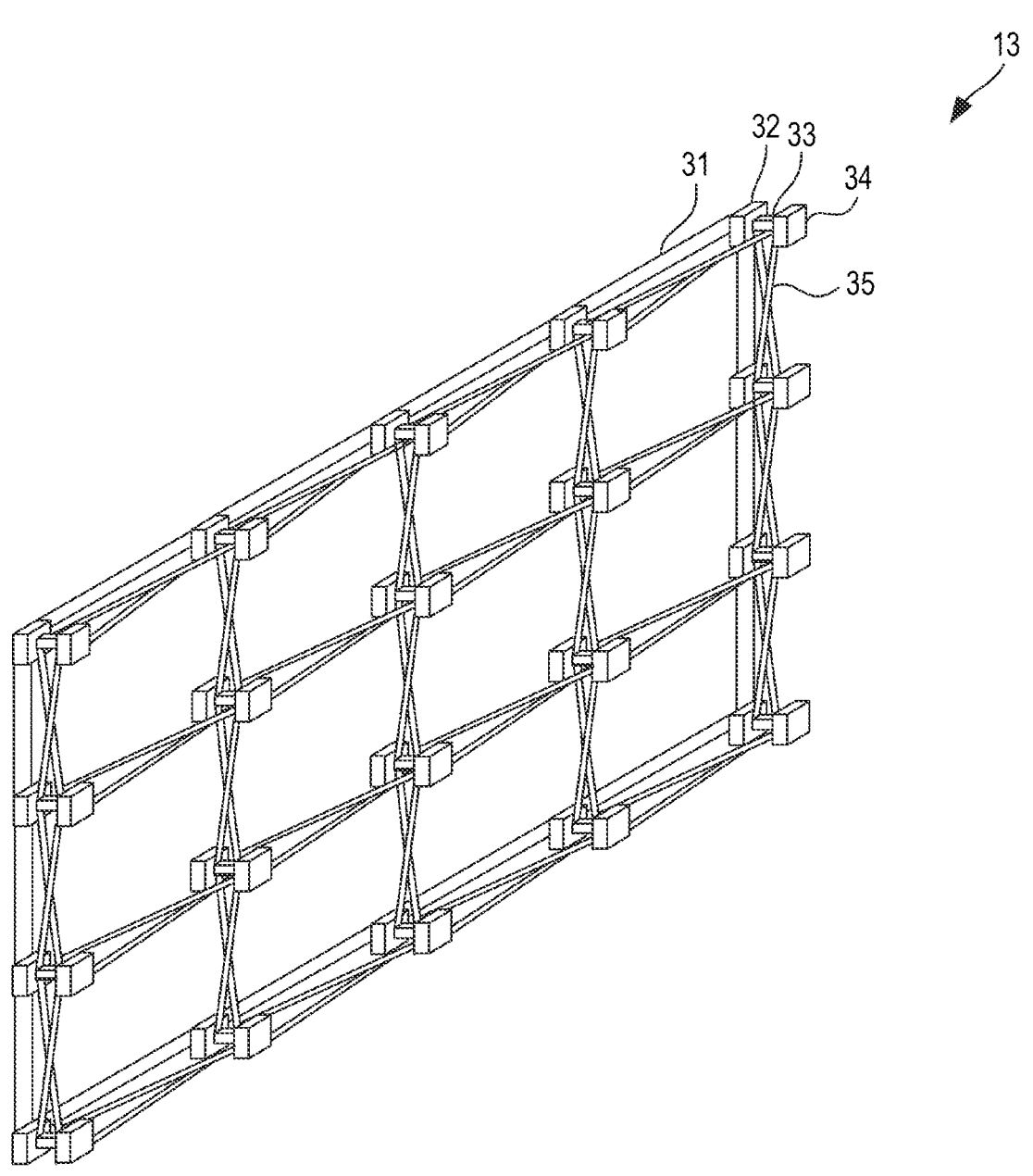
FIG. 2 is a perspective view of a frame when a panel is removed.

FIG. 2 is a perspective view of the frame 13 when the panel 10 and the intermediate member 15 are removed. The frame 13 includes a base 31, a rear block 32, a connecting member 33, a front block 34, and a connecting frame 35.

Each of the front block 34 and the rear block 32 has, for example, a rectangular parallelepiped shape. The front blocks 34 are provided corresponding to four corners of the plate-shaped panel 10. In this example, the frame 13 includes twenty front blocks 34, and the twenty front blocks 34 are arranged at respective four corners of the twelve panels 10. The bottom surfaces of the twenty front blocks 34 are attached to the four corners of the plate-shaped panel 10. In other words, the panel 10 is configured to be detachably attached to the frame 13.

The rear block 32 has, for example, a rectangular parallelepiped shape. The frame 13 includes twenty rear blocks 32, that is, the number of the rear blocks 32 are the same as that of the front blocks 34. The connecting member 33 connects the rear block 32 and the front block 34 in a front-rear direction.

The base 31 vertically and horizontally connects fourteen rear blocks 32 side by side. The fourteen rear blocks 32 are arranged on the outermost periphery of the frame 13.

The connecting frame 35 vertically and horizontally connects the rear block 32 and the front block 34 side by side. For example, the front block 34 at the upper right in the drawing is connected to, via the connecting frame 35, the rear block 32 immediately below in a vertical direction when the frame 13 is viewed from the front. Further, for example, the front block 34 at the upper right in FIG. 2 is connected to, via the connecting frame 35, the rear block 32 immediately left in a horizontal direction when the frame 13 is viewed from the front.

Accordingly, the frame 13 stably connects the twenty rear blocks 32 and the twenty front blocks 34. The five rear blocks 32 and the five front blocks 34, which are arranged at the bottom in the vertical direction when the frame 13 is viewed from the front, are placed on a placement surface such as a floor or the like. Thus, the frame 13 stands by itself with the bottom surfaces of the twenty front blocks 34 facing the front.

The base 31 is bendable at the center. The two connecting frames 35 are rotatably connected at the center of the rear blocks 32 and the front blocks 34 that are vertically and horizontally arranged. Accordingly, the frame 13 is foldable into a small size.

Figure 3:
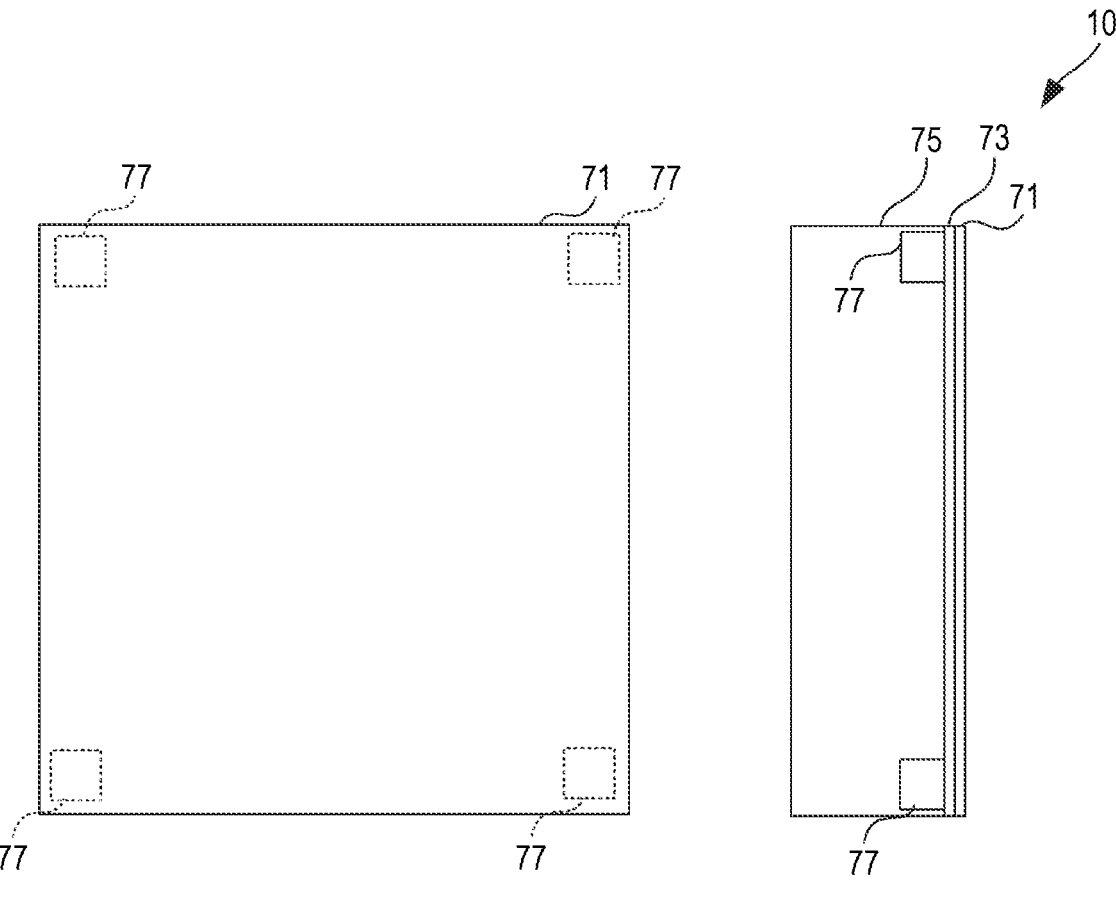
FIG. 3 is a front view and a side view of the panel.

FIG. 3 is a front view and a side view of the panel 10. A diagram shown on a left side of FIG. 3 is a front view of the panel 10, and a diagram shown on a right side of FIG. 3 is a left side view of the panel 10. The other individual panels also have the same configuration as the panel 10 shown in FIG. 3.

The panel 10 includes a first screen sheet 71, a first aluminum vapor deposition layer 73, a plate member 75, and a magnet 77.

The first screen sheet 71 is made of a resin material such as polyethylene, polypropylene, polyester, or polyvinyl chloride. A front side of the first screen sheet 71 is coated in white, and projects a video of a projector. Accordingly, the panel 10 functions as a flat screen. In other other words, the panel 10 is configured to display an image projected by the projector.

The first aluminum vapor deposition layer 73 is an example of a first blocking film according to the present disclosure, and is vapor deposited on a back surface of the first screen sheet 71. The first aluminum vapor deposition layer 73 blocks external light from the back surface of the first screen sheet 71. Thus, the first aluminum vapor deposition layer 73 improves the quality of the video projected onto the first screen sheet 71.

In FIG. 3, the thicknesses of the first aluminum vapor deposition layer 73 and the thicknesses of the first screen sheet 71 are shown to be approximately the same for the sake of description. However, the thickness of the first aluminum vapor deposition layer 73 is approximately several nm to several hundred nm, and the thickness of the first screen sheet 71 is approximately several μm to several hundred μm.

The plate member 75 is an example of a base material according to the present disclosure, and is a flat member made of a material such as metal, resin, or wood. The thickness of the plate member 75 is several cm to several tens of cm. As an example, the plate member 75 according to the present embodiment is made of a foamed member such as foamed polystyrene. Since the plate member 75 is made of a foamed member, the plate member 75 is fairly lightweight with respect to the volume thereof. Therefore, an event organizer can easily carry the panel 10.

A front surface of the plate member 75 and the back surface of the first screen sheet 71 are attached to each other via an adhesive (not shown).

The magnet 77 is embedded in a peripheral portion (four corners in this example) of the plate member 75 in a front view. When the front block 34 is made of a magnetic material, the panel 10 is attracted to the front block 34 by the magnet 77. The method for attaching the panel 10 to the frame 13 is not limited to attraction by the magnet. For example, the panel 10 may be attached to the front block 34 by a hook-and-loop fastener. Alternatively, the panel 10 may be attached by screwing from a rear surface of the front block 34. However, the panel 10 is attracted to the front block 34 by the magnet, so that the panel 10 is easily detached and attached.

The front block 34 serves as a guide for attaching the panel 10 and at the same time functions as a holding member that holds the panel 10. Accordingly, the front block 34 can prevent the panel 10 from falling or shifting. The event organizer implements the screen unit 1 by attracting the twelve panels 10 to the frame 13 in a state shown in FIG. 2.

The screen unit 1 can be disassembled into a plurality of panels 10. The frame 13 is foldable into a small size. Therefore, the event organizer can easily bring in the screen unit 1 even from a narrow entrance of a venue or the like. Since the frame 13 stands by itself, a structure for hanging or fixing the screen is not necessary. The screen unit 1 can freely change the size and angle of view (the aspect ratio) depending on the venue or the content of an event. By preparing any number of panels 10, the event organizer can easily install a screen having the optimum size and angle of view (the aspect ratio) to match the venue or the content of the event.

The screen unit 1 includes the intermediate member 15 provided across the plurality of panels in a front view when the plurality of panels 10 are connected. In an example of FIG. 1, the screen unit 1 includes 17 rectangular intermediate members so as to close a gap between the adjacent panels 10 when the twelve panels 10 are connected.

The screen unit 1 may include the intermediate member 15 having the same length as the total length of three panels 10 vertically connected to close the gap between the adjacent panels 10 and the intermediate member 15 having the same length as the total length of four panels 10 horizontally connected to close the gap between the adjacent panels 10.

Figure 4:
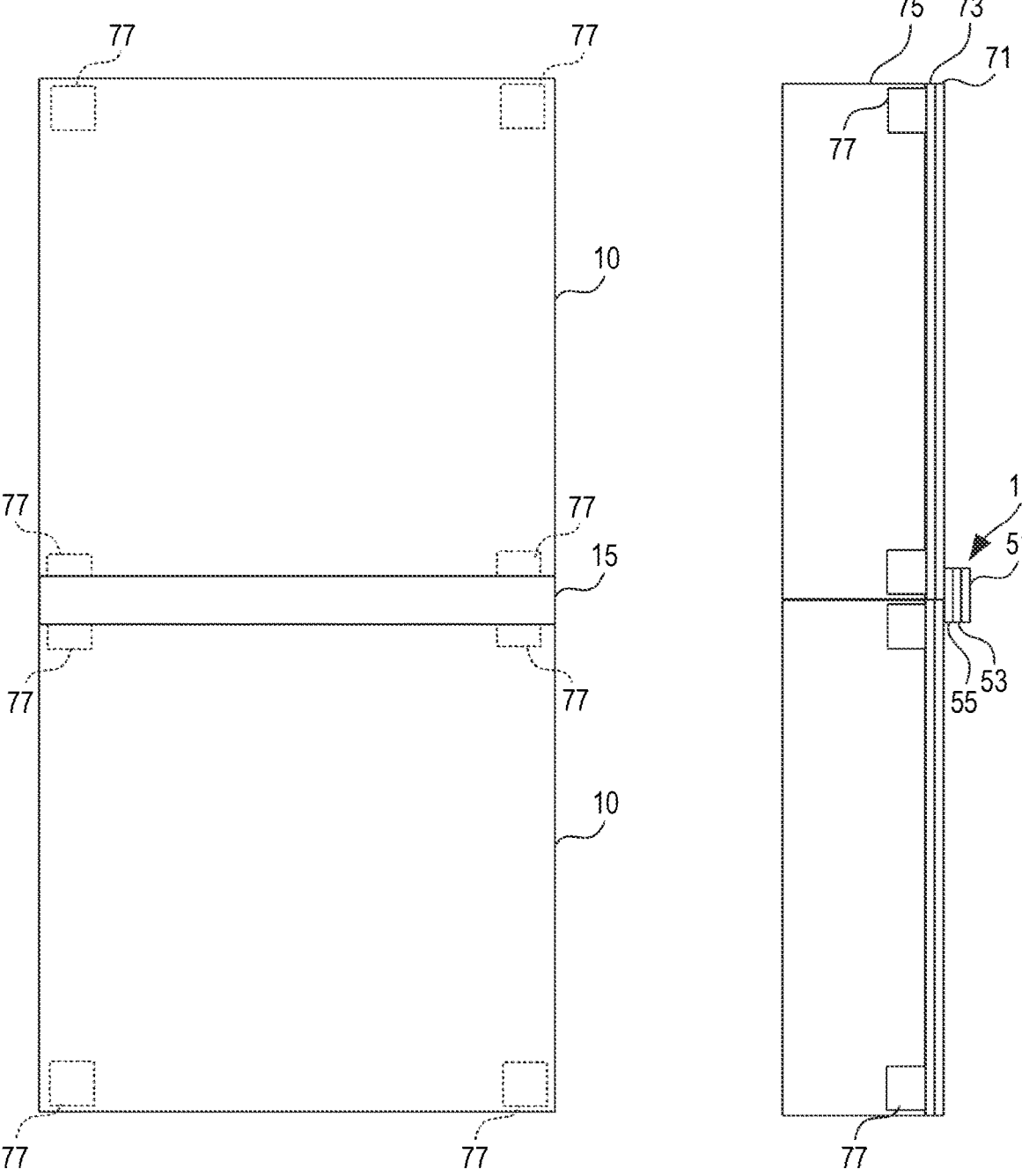
FIG. 4 is a front view and a side view of two panels.

FIG. 4 is a front view and a side view when two panels 10 are vertically arranged. A diagram shown on a left side of FIG. 4 is a front view when the two panels 10 are vertically arranged, and a diagram shown on a right side of FIG. 4 is a left side view when the two panels 10 are vertically arranged. In FIG. 4, the thickness of the intermediate member 15 is shown large for the sake of description. However, in reality, the thickness of the intermediate member 15 is fairly small, and is approximately several μm to several hundred μm.

The intermediate member 15 includes a second screen sheet 51, a second aluminum vapor deposition layer 53, and a magnetic sheet 55. The second screen sheet 51 has the same optical characteristics as the first screen sheet 71. That is, the intermediate member 15 is configured to display an image projected by the projector.

The second aluminum vapor deposition layer 53 is an example of a second blocking film according to the present disclosure, and is vapor deposited on a back side of the second screen sheet 51. The second aluminum vapor deposition layer 53 blocks external light from a back surface of the second screen sheet 51. Thus, the second aluminum vapor deposition layer 53 improves the quality of the video projected onto the second screen sheet 51. The second aluminum vapor deposition layer 53 has the same optical characteristics as the first aluminum vapor deposition layer 73.

The "same optical characteristics" in the present disclosure does not necessarily require the exact same characteristics, but may be the characteristics to the extent that the effects of the present disclosure are exhibited.

Similar to the first screen sheet 71, the second screen sheet 51 is made of a resin material such as polyethylene, polypropylene, polyester, or polyvinyl chloride. The front side of the first screen sheet 71 is coated in white. However, the second screen sheet 51 does not need to be made of the same material as the first screen sheet 71.

The magnetic sheet 55 is attached to the back surface of the second screen sheet 51 via an adhesive (not shown). The second screen sheet 51 is attracted to the magnet 77 of the plate member 75 by the magnetic sheet 55. Accordingly, the intermediate member 15 can be attached to or detached from a boundary of the panel 10 easily by magnetic force without using an adhesive or a double-sided tape.

The first screen sheet 71 and the second screen sheet 51 have the same optical characteristics, and the first aluminum vapor deposition layer 73 and the second aluminum vapor deposition layer 53 have the same optical characteristics. Accordingly, an entire front surface of the screen unit 1 including the plurality of panels 10 has the same optical characteristics. Therefore, as a new customer experience, a user such as an event participant can view only the video of the projector without caring a gap between the plurality of panels 10, and can attain a fairly high sense of immersion in an event. As the new customer experience, the event organizer can fairly easily install a high-quality screen unit, easily carry the screen unit, and easily change the projected area.

The thickness of the intermediate member 15 is fairly small, and is approximately several μm to several hundred μm. The first screen sheet 71 and the second screen sheet 51 have the same optical characteristics, and the first aluminum vapor deposition layer 73 and the second aluminum vapor deposition layer 53 have the same optical characteristics. Therefore, it is difficult for the user such as an event participant to visually recognize a boundary between the intermediate member 15 and the panel 10 even when obliquely viewing the screen unit 1. Accordingly, as the new customer experience, the user such as an event participant can view only the video of the projector without caring about the intermediate member 15, and can attain a fairly high sense of immersion in an event.

In the above-described embodiment, the front side of the first aluminum vapor deposition layer 73 serving as the first blocking film and the front side of the second aluminum vapor deposition layer 53 serving as the second blocking film have the specular reflection characteristics. Accordingly, the front side of the first blocking film and the front side of the second blocking film reflect the light leaking from the first screen sheet 71 and the second screen sheet 51 to back sides to improve the quality of the video projected onto the first screen sheet 71 and the second screen sheet 51. However, it is not essential for the front side of the first blocking film and the front side of the second blocking film to have the specular reflection characteristics. For example, in the screen unit 1, the first blocking film alone may have the specular reflection characteristics, or the second blocking film alone may have the specular reflection characteristics.

Each of the first blocking film and the second blocking film is not limited to an aluminum vapor deposition layer. For example, each of the first blocking film and the second blocking film may be a blackout curtain, a thick curtain used for chroma keying, etc. Alternatively, each of the first blocking film and the second blocking film may be a meal foil such as an aluminum foil. When the metal foil is used, it is possible to improve flame resistance property, heat resistance property, and humidity resistance property. A light blocking rate of each of the first blocking film and the second blocking film is, for example, 99.40% or more. The light blocking rate may be 99.80% or more, or may be 99.99% or more.

Next, a method for assembling and disassembling the screen unit 1 according to the present embodiment is described.

The screen unit 1 may be assembled by a method including steps as follows:

(Step 1) placing the frame 13 on the placement surface;

(Step 2) attaching the panels 10 serving as a flat screen to the frame 13 placed on the placement surface; and (Step 3) providing the intermediate member 15 across the panels 10 attached to the frame 13.

Further, the frame 13 is foldable as described above. Consequently, the method for assembling the screen unit 1 may further include expanding the frame 13 that is in a folded state before Step 1 or Step 2. According to the method, it is possible to carry the screen unit 1 more easily.

The screen unit 1 may be disassembled by a method including steps as follows:

(Step 4) detaching the intermediate member 15 from the screen unit 1 that is assembled; and (Step 5) detaching the panels 10 from the frame 13.

Further, the frame 13 is foldable as described above. Consequently, the method for disassembling the screen unit 1 may further include folding the frame 13 after Step 5. According to the method, it is possible to carry the screen unit 1 more easily.

Figure 5:
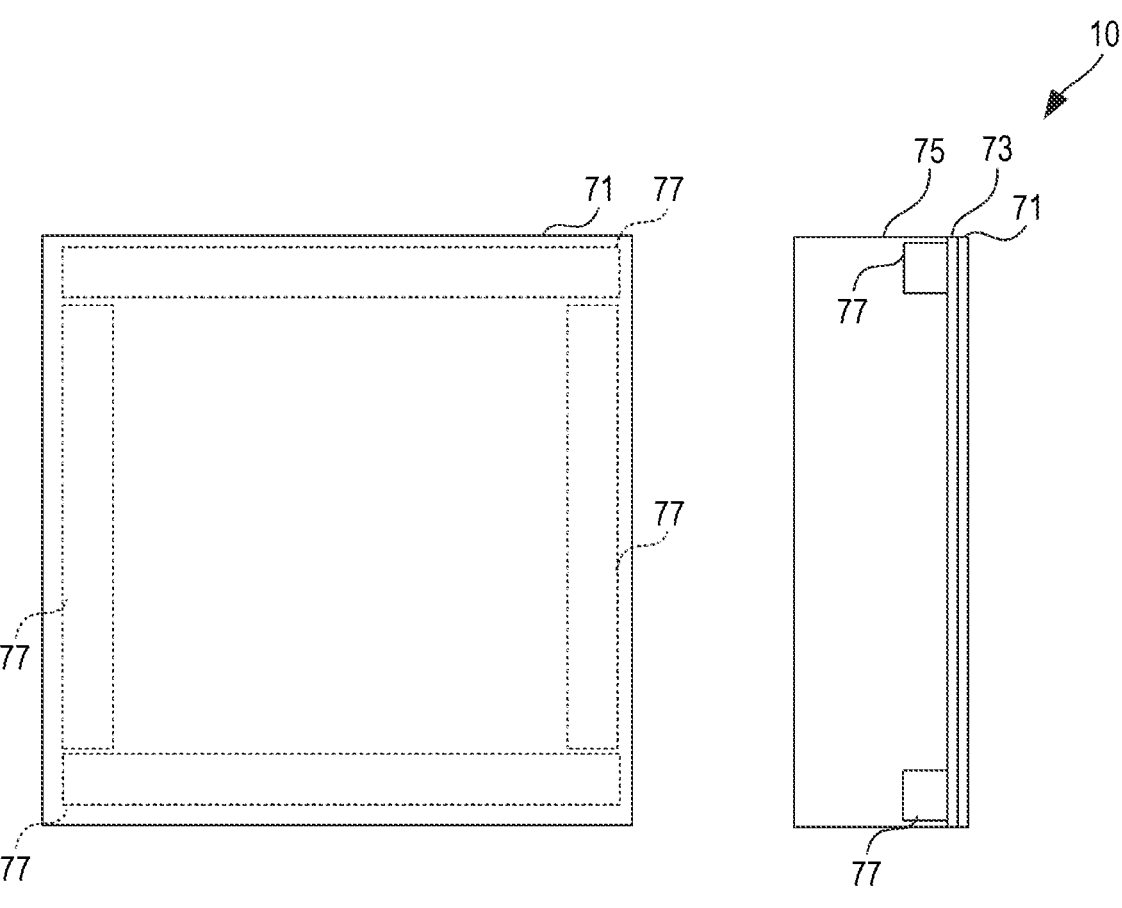
FIG. 5 is a front view and a side view of a panel according to a modification 1.

FIG. 5 is a front view and a side view of a panel 10 according to a modification 1. In the above-described embodiment, the magnet 77 is embedded in four corners of the plate member 75. The magnet 77 of the panel 10 according to the modification 1 is embedded in all peripheral portions (four sides and four corners) when the plate member 75 is viewed from the front.

Accordingly, the entire surface of the intermediate member 15 is attracted to the first screen sheet 71. Therefore, the intermediate member 15 can be prevented from lifting off from the first screen sheet 71. Therefore, as the new customer experience, the user such as an event participant can view only the video of the projector without caring the intermediate member 15, and can attain a higher sense of immersion in an event.

FIG. 6 is a front view and a side view when two panels 10 according to a modification 2 are vertically arranged. In the modification 2, a third screen sheet 79 is further attached to a front surface of the first screen sheet 71. The third screen sheet 79 is attached to the front surface of the first screen sheet 71 with, for example, an adhesive. Like the first screen sheet 71, the third screen sheet 79 is made of a resin material such as polyethylene, polypropylene, polyester, or polyvinyl chloride. The front side of the first screen sheet is coated in white. The first screen sheet 71 and the third screen sheet 79 have the same optical characteristics.

The third screen sheet 79 has an area smaller than the area of the first screen sheet 71 in a front view. Therefore, when the panel 10 is viewed from the front, the first screen sheet 71 is exposed from an outer peripheral portion of the third screen sheet 79.

The intermediate member 15 is attached to the first screen sheet 71 so as to cover a portion where the first screen sheet 71 is exposed when the plurality of panels 10 are arranged. The height (the thickness) of the third screen sheet 79 is the same as the height (the thickness) of the intermediate member 15. Therefore, front surfaces of the intermediate member 15 and the third screen sheet 79 have the same height. Accordingly, even when the light of the projector is obliquely emitted, no shadow is generated.

Therefore, as the new customer experience, the user such as an event participant can view only the video of the projector without caring the intermediate member 15, and can attain a higher sense of immersion in an event.

Figure 7:
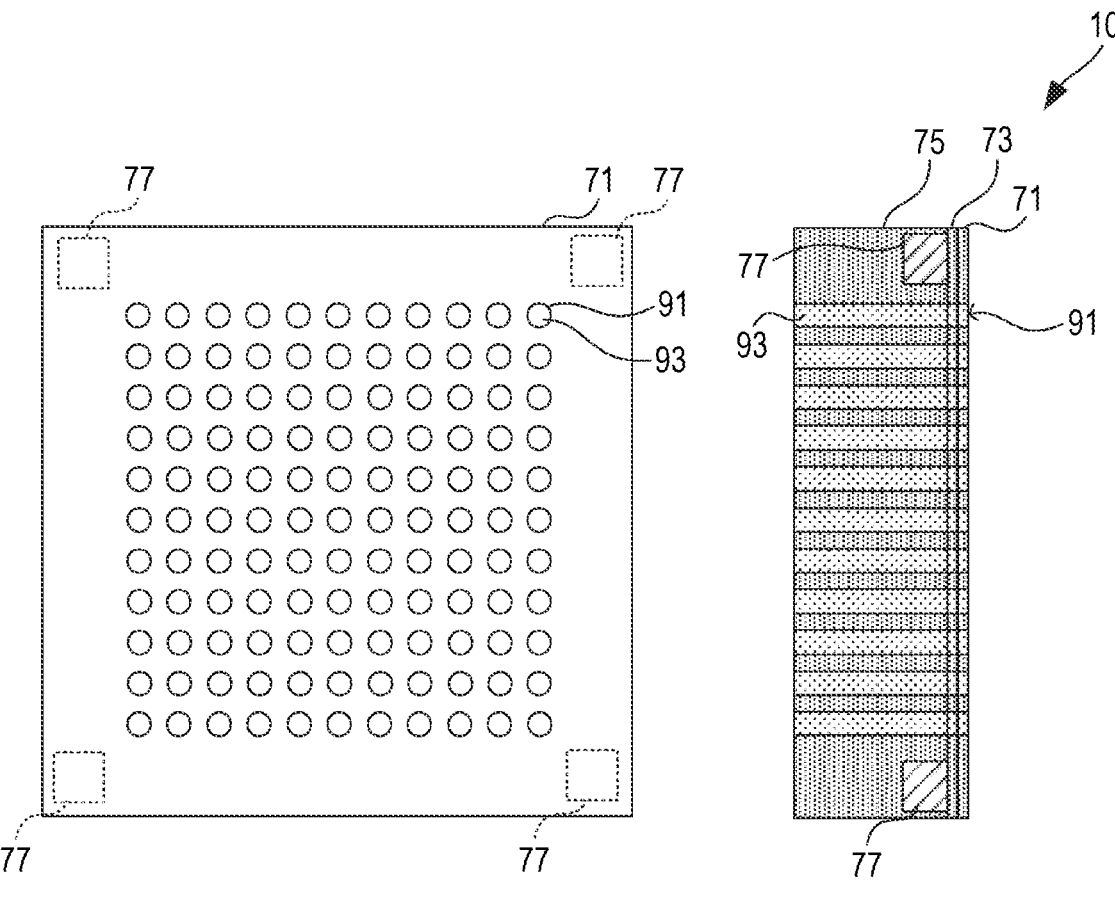
FIG. 7 is a front view and a side view of the panel according to a modification 3.

FIG. 7 is a front view and a side view of the panel 10 according to a modification 3. The panel 10 according to the modification 3 is formed with a large number of holes 91 in a front view. In an example in FIG. 7, the panel 10 has 11 rows and 11 columns of holes 91 in a front view. The hole 91 has a circular shape in a front view. However, the number and the shape of the holes 91 are not limited to the example in FIG. 7. The hole 91 penetrates the first screen sheet 71, the first aluminum vapor deposition layer 73, and the plate member 75 from a front surface to a back surface. In other words, the hole 91 extends through an entire thickness of the panel 10. Accordingly, the panel 10 acoustically communicates the back surface and the front surface.

Therefore, when a speaker is disposed on the back surface of the screen unit 1 including the plurality of panels 10, the sound output from the speaker reaches the front surface of the screen unit 1 through the hole 91. The user such as an event participant can experience the sound coming from the front surface of the screen unit 1 as a new customer experience.

The hole 91 may be filled with a porous material 93 such as a non-woven fabric or a sponge. The porous material 93 does not inhibit the passage of the sound through the hole 91. The porous material 93 has the same optical characteristics as the first screen sheet 71. Accordingly, the entire front surface of the screen unit 1 has the same optical characteristics. Therefore, as a new customer experience, the user such as an event participant can experience the sound coming from the front surface of the screen unit 1 and naturally view the video of the projector.

Figure 8:
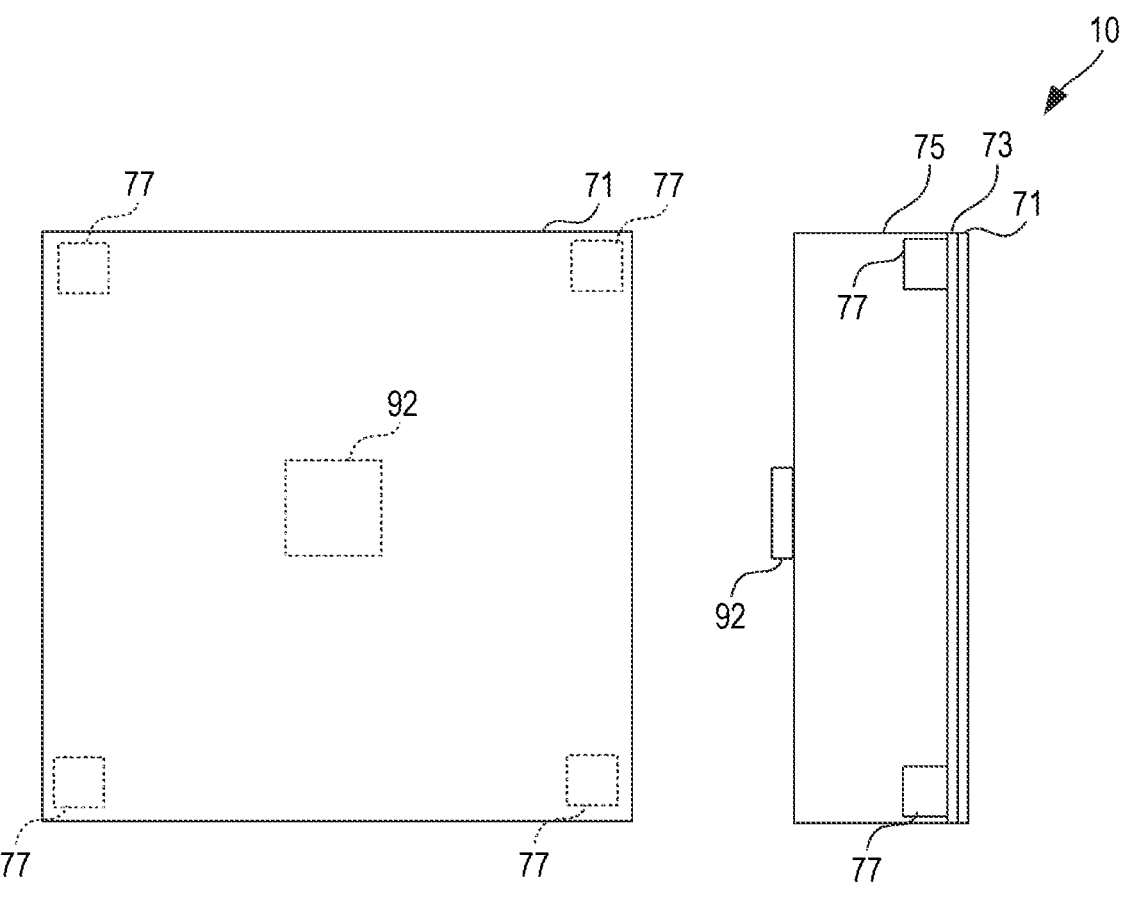
FIG. 8 is a front view and a side view of the panel according to a modification 4.
Figure 17:
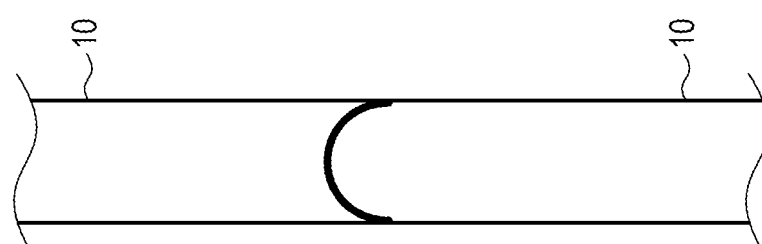
FIG. 17 is a side view of two panels according to a modification 13 when the two panels are vertically arranged, particularly illustrating opposing side surfaces of the two panels and part of the two panels in the vicinity thereof.
Figure 16:
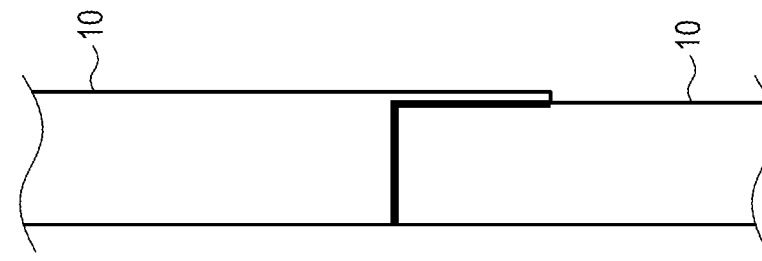
FIG. 16 is a side view of two panels according to a modification 12 when the two panels are vertically arranged, particularly illustrating opposing side surfaces of the two panels and part of the two panels in the vicinity thereof.
Figure 15:
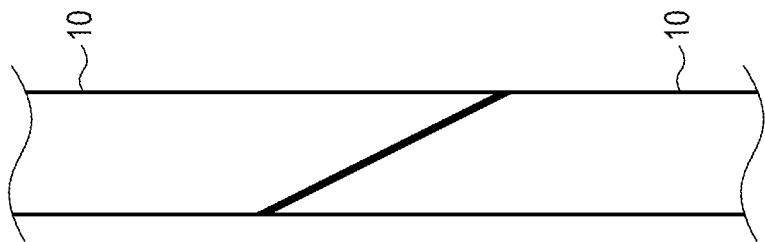
FIG. 15 is a side view of two panels according to a modification 11 when the two panels are vertically arranged, particularly illustrating opposing side surfaces of the two panels and part of the two panels in the vicinity thereof.

FIG. 8 is a front view and a side view of the panel 10 according to a modification 4. An actuator 92 is attached to a back surface of the panel 10 according to the modification 4. The actuator 92 includes, for example, a piezoelectric vibrator or a motor vibrator. The actuator 92 receives a sound signal and vibrates the panel 10 according to the sound signal. Accordingly, the panel 10 functions as a speaker.

FIGS. 9 to 13 are front views of panels 10 according to modifications 5 to 9, respectively. In the modification 1 shown in FIG. 5, the magnet 77 is embedded in all peripheral portions (four sides and four corners) when the plate member 75 is viewed from the front. The magnet 77 of the panel 10 of each of the modifications 5 to 9 is embedded in the peripheral portions of the plate member 75 along the four sides and except for the four corners when the plate member 75 is viewed from the front.

As shown in FIG. 9, the magnet 77 of the panel 10 according to the modification 5 is embedded in the four sides of the peripheral portions of the plate member 75 except for the four corners thereof when the plate member 75 is viewed from the front. Consequently, similarly to the modification 1, it is possible to attract substantially the entire surface of the intermediate member 15 to the first screen sheet 71. Further, as compared with the modification 1, it is possible to reduce the weight of the panel 10.

As shown in FIG. 10, in the magnet 77 of the panel 10 according to the modification 6, as compared with the magnet 77 of the modification 5, a plurality of rectangular cuts are formed on an inner side of the magnet 77 when the plate member 75 is viewed from the front.

As shown in FIG. 11, in the magnet 77 of the panel 10 according to the modification 7, as compared with the magnet 77 of the modification 5, a plurality of V-shaped cuts are formed on an inner side of the magnet 77 when the plate member 75 is viewed from the front.

As shown in FIG. 12, the magnets 77 of the panel 10 according to the modification 8 are embedded in each of the four sides of the peripheral portions of the plate member 75 except for the four corners thereof when the plate member 75 is viewed from the front such that the magnets 77 are spaced from each other in a direction perpendicular to the corresponding one of the four sides. In other words, in the magnet 77 of the modification 8, as compared with the magnet 77 of the modification 5, slits extending along the four sides are formed.

As shown in FIG. 13, the magnets 77 of the panel 10 according to the modification 9 are embedded in each of the four sides of the peripheral portions of the plate member 75 except for the four corners thereof when the plate member 75 is viewed from the front such that the magnets 77 are spaced from each other along the corresponding one of the four sides. In other words, in the magnet 77 of the modification 9, as compared with the magnet 77 of the modification 5, gaps are formed along the four sides.

According to the panels 10 of the modifications 6 to 9, similarly to the modification 1, it is possible to attract substantially the entire surface of the intermediate member 15 to the first screen sheet 71. Further, as compared with the modification 5, it is possible to reduce the weight of the panel 10.

FIGS. 14 to 17 are side views of two panels 10 according to modifications 10 to 13, respectively, when the two panels 10 are vertically arranged, particularly illustrating opposing side surfaces of the two panels 10 and part of the two panels 10 in the vicinity thereof. In the above-described embodiment, each of four side surfaces of the panel 10 is formed by a flat surface perpendicular to the front surface and the back surface of the panel 10. In the panels 10 of the modifications 10 to 13, the four side surfaces have shapes different from those of the four side surfaces in the above-described embodiment.

Figure 14:
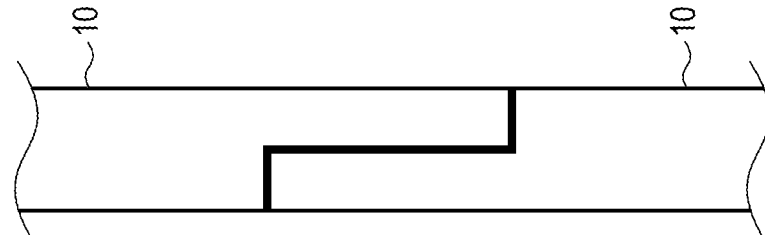
FIG. 14 is a side view of two panels according to a modification 10 when the two panels are vertically arranged, particularly illustrating opposing side surfaces of the two panels and part of the two panels in the vicinity thereof.

In the panel 10 according to the modification 10 show in FIG. 14, a step is formed on the side surface in side view. In the panel 10 according to the modification 11 show in FIG. 15, the side surface is formed to incline in side view. In the panel 10 according to the modification 12 shown in FIG. 16, a part of the side surface is formed to protrude in side view. In the panel 10 according to the modification 13 show in FIG. 17, the side surface is formed to curve in side view.

According to the panels 10 of the modifications 10 to 13, the panels 10 are arranged such that ends of adjacent panels 10 overlap with each other. Consequently, it is possible to attach the panels 10 to the frame 13 while preventing a gap between adjacent panels 10.

Therefore, as a new customer experience, the user such as an event participant can experience the sound coming from the front surface of the screen unit 1 and naturally view the video of the projector. The description of the present embodiment should be considered to be illustrative in all respects and not restrictive. The scope of the present disclosure is indicated by the claims rather than the above-described embodiment. Further, the scope of the present disclosure includes the scope equivalent to the claims.

What is claimed is:

1. A screen unit comprising:

a frame;

a plurality of panels configured to display an image projected by a projector and configured to be detachably attachable to the frame; and an intermediate member configured to display the image projected by the projector and being provided across the plurality of panels in a state where the plurality of panels are detachably attached to the frame, wherein each of the plurality of panels comprises a first screen sheet on which a video is projected, a first blocking film configured to block light, and a base material, wherein the intermediate member comprises a second screen sheet and a second blocking film, and wherein the first screen sheet on which the video is projected and the second screen sheet have the same optical characteristics as each other, and the first blocking film configured to block light and the second blocking film have the same optical characteristics as each other.

2. The screen unit according to claim 1, wherein a front side of the first blocking film has specular reflection characteristics, and a front side of the second blocking film has specular reflection characteristics.

3. The screen unit according to claim 1, wherein the intermediate member further comprises a magnetic sheet on a back surface of the second blocking film.

4. The screen unit according to claim 3, wherein each of the plurality of panels further comprises a magnet embedded in the base material.

5. The screen unit according to claim 1, wherein the base material comprises a foamed member.

6. The screen unit according to claim 1, wherein each of the plurality of panels includes a plurality of holes extending through an entire thickness of each of the plurality of panels.

7. The screen unit according to claim 6, wherein each of the plurality of holes is filled with a porous material.

8. The screen unit according to claim 1, further comprising:

an actuator attached to a back surface of each of the plurality of panels.

9. The screen unit according to claim 1, wherein the first blocking film comprises an aluminum vapor deposition layer.

10. The screen unit according to claim 1, wherein the second blocking film comprises an aluminum vapor deposition layer.

11. The screen unit according to claim 1, wherein the video is projected on a front side of the screen unit, and each of the plurality of panels comprises, in order from the front side of the screen unit to a rear side of the screen unit, the first screen sheet, the first blocking film, and the base material.

12. The screen unit according to claim 11, wherein the intermediate member comprises, in order from the front side of the screen unit to the rear side of the screen unit, the second screen sheet and the second blocking film.

13. The screen unit according to claim 1, wherein each of the plurality of panels further comprises a magnet disposed in a peripheral portion of the base material.

14. The screen unit according to claim 1, wherein each of the plurality of panels is configured to function as a flat screen.

15. The screen unit according to claim 1, wherein the frame is foldable.

16. The screen unit according to claim 1, wherein each panel of the plurality of panels includes four corners, and in a state where each panel of the plurality of panels is attached to the frame, the four corners of each panel of the plurality of panels are attached to the frame.

17. A method for assembling a screen unit, the method comprising:

placing a frame on a placement surface;

attaching a plurality of panels to the frame placed on the placement surface, the plurality of panels being configured to display an image projected by a projector; and providing an intermediate member across the plurality of panels attached to the frame, the intermediate member being configured to display the image projected by the projector, wherein each of the plurality of panels comprises a first screen sheet on which a video is projected, a first blocking film configured to block light, and a base material, wherein the intermediate member comprises a second screen sheet and a second blocking film, and wherein the first screen sheet on which the video is projected and the second screen sheet have the same optical characteristics as each other, and the first blocking film configured to block light and the second blocking film have the same optical characteristics as each other.

18. The method according to claim 17, wherein the frame is foldable, wherein the method further comprises expanding the frame that is in a folded state before attaching the plurality of panels to the frame, and wherein the plurality of panels are attached to the frame in a state in which the frame is expanded.

19. A method for disassembling a screen unit, the method comprising:

detaching an intermediate member from a screen unit, the screen unit comprising a frame and a plurality of panels configured to display an image projected by a projector and to be detachably attachable to the frame, the intermediate member being configured to display the image projected by the projector and being provided across the plurality of panels detachably attached to the frame; and detaching the plurality of panels from the frame, wherein each of the plurality of panels comprises a first screen sheet on which a video is projected, a first blocking film configured to block light, and a base material, wherein the intermediate member comprises a second screen sheet and a second blocking film, and wherein the first screen sheet on which the video is projected and the second screen sheet have the same optical characteristics as each other, and the first blocking film configured to block light and the second blocking film have the same optical characteristics as each other.

20. The method according to claim 19, wherein the frame is foldable, wherein the method further comprises folding the frame after detaching the plurality of panels.

* * * * *